(12) United States Patent
Ankaiah et al.

(10) Patent No.: US 12,531,864 B2
(45) Date of Patent: Jan. 20, 2026

(54) PREDICTIVE DOMAIN NAME REQUEST CATEGORIZATION AND PREFETCH

(71) Applicant: Cambium Networks Ltd, Ashburton (GB)

(72) Inventors: Shashi Hosakere Ankaiah, Karnatake (IN); Trevor Miranda, San Francisco, CA (US); Vivek Lakshminarayana Atreya, Karnatake (IN)

(73) Assignee: Cambium Networks Ltd, Ashburton (GB)

( * ) Notice: Subject to any disclaimer, the term of this patent is extended or adjusted under 35 U.S.C. 154(b) by 44 days.

(21) Appl. No.: 18/735,655

(22) Filed: Jun. 6, 2024

(65) Prior Publication Data
US 2025/0193192 A1    Jun. 12, 2025

(30) Foreign Application Priority Data
Dec. 12, 2023    (IN) .............................. 202341084802

(51) Int. Cl.
*H04L 9/40*      (2022.01)
*H04L 61/4511*   (2022.01)

(52) U.S. Cl.
CPC .......... *H04L 63/10* (2013.01); *H04L 61/4511* (2022.05)

(58) Field of Classification Search
None
See application file for complete search history.

(56) References Cited

U.S. PATENT DOCUMENTS

| | | |
|---|---|---|
| 2012/0303808 A1 | 11/2012 | Xie et al. |
| 2013/0054747 A1 | 2/2013 | Berman et al. |
| 2020/0244622 A1* | 7/2020 | Lai .......... G06F 18/214 |
| 2021/0377303 A1* | 12/2021 | Bui .......... G06F 40/14 |
| 2023/0319069 A1* | 10/2023 | Birch .................. H04L 63/1466 |
| | | 726/22 |
| 2023/0350961 A1* | 11/2023 | Rubenstein ......... G06F 16/9532 |
| 2023/0396584 A1 | 12/2023 | Brecl et al. |

OTHER PUBLICATIONS

Extended European Search Report for EP Application No. 24206221.4 dated Mar. 31, 2025 (6 pp.).

\* cited by examiner

*Primary Examiner* — Jeffrey R Swearingen
(74) *Attorney, Agent, or Firm* — Crowell & Moring LLP

(57) ABSTRACT

A method and system for managing domain name requests over a communications network, wherein the method involves predicting domain names associated with requests generated by a user device using a model. The model predicts domain names likely to be requested following receipt of an initial domain name request. The method also includes receiving the initial domain name request, processing it to determine predicted domain names, and sending a request including these predicted domain names to a domain name categorization server. A response is received containing categorization data for the initial and predicted domain names. This categorization data is used to filter domain name requests, controlling access to resources associated with these domain names.

23 Claims, 8 Drawing Sheets

| Device_ID | Allowed Categories | Blocked Categories |
|---|---|---|
| ID_1 | CAT_1, CAT_2 | CAT_3 |
| ID_2 | CAT_1, CAT_3 | CAT_2 |
| D_3 | CAT_1, CAT_2 | CAT_3 |
| ID_4 | CAT_2, CAT_3 | CAT_1 |

204A: row 1; 204B: row 2; 204C: row 3; 204D: row 4

504

| Domain Name | Categorization |
|---|---|
| URL_1 | CAT_1 |
| URL_P1 | CAT_2 |
| URL_P2 | CAT_3 |
| URL_P3 | CAT_2 |
| URL_P4 | CAT_1, CAT_3 |
| URL_P5 | CAT_1, CAT_2 |
| ... | ... |

PREDICTIVE DOMAIN NAME REQUEST CATEGORIZATION AND PREFETCH

CROSS-REFERENCE TO RELATED APPLICATION

This application claims priority to India Patent Application No. 202341084802, filed on Dec. 12, 2023, the entirety of which is hereby fully incorporated by reference herein.

TECHNICAL FIELD

The present invention relates generally to network management and more specifically to a method and system for managing domain name requests from user devices.

BACKGROUND

In today's networked world, user devices frequently need to access resources, such as web pages, applications, and services, which are hosted on other devices accessible over wide area networks, such as the internet. Domain name requests are processes by which user devices may interact with the Domain Name System (DNS) to resolve domain names into IP addresses. This is typically done by the user's device sending a domain name request over a network to a DNS server, which determines a respective Internet Protocol (IP) address, through domain name resolution, and provides the same to the user device. This enables the user device to establish a connection with a web server hosting the requests resource, such as a website or service.

Domain names are fundamental to this process. They are human-friendly identifiers for devices on the network, such as servers hosting the desired resources. A domain name system (DNS) server is usually responsible for translating these domain names into Internet Protocol (IP) addresses, which are machine-friendly identifiers that can be used to route data over a network to the correct device.

SUMMARY

According to a first aspect of the present disclosure there is provided a method for enabling user devices to access resources hosted on one or more further devices over a communications network, access to said resources being filtered according to domain name categorization, the method comprising: providing a model for predicting one or more domain names associated with domain name requests to be generated by a user device, wherein the model is configured to generate a prediction of one or more domain name requests that are likely to be received from a user device following receipt of a first domain name request from the user device; receiving the first domain name request from the user device, the first domain name request including an indication of a first domain name; processing the first domain name using the model to determine a set of one or more predicted domain names; sending a request to a domain name categorization server over a communications network, the request including the first domain name and the set of one or more predicted domain names; receiving a response to the request, the response including categorization data for the first domain name and the set of one or more predicted domain names; and performing domain name request filtering based on the categorization data.

Performing domain name categorization and filtering, while supporting network security and increasing network management control, can lead to a degradation in performance and particular service latency for user devices. By generating predictions of domain names which are expected to be requested by a user device and requesting categorization data for these domain names in advance of them actually being requested, it is possible to reduce the latency in network service for user devices while allowing sophisticated domain name filtering processes to be implemented in the network 200 which may increase security and control in the network 200.

According to a second aspect of the present disclosure there is provided a network management device comprising at least one processor, at least one communications device, and storage comprising computer-executable instructions which, when executed by the at least one processor, cause the network management device to: provide a model for predicting one or more domain names associated with domain name requests to be generated by a user device, wherein the model is configured to generate a prediction of one or more domain name requests that are likely to be received from a user device following receipt of a first domain name request from the user device; receive the first domain name request from the user device, the first domain name request including an indication of a first domain name; process the first domain name using the model to determine a set of one or more predicted domain names; send a request to a domain name categorization server over a communications network, the request including the first domain name and the set of one or more predicted domain names; receive a response to the request, the response including categorization data for the first domain name and the set of one or more predicted domain names; and perform domain name request filtering based on the categorization data.

According to a third aspect of the present disclosure there is provided a non-transitory computer readable storage medium comprising computer-executable instructions which, when executed by a processor, cause the processer to: provide a model for predicting one or more domain names associated with domain name requests to be generated by a user device, wherein the model is configured to generate a prediction of one or more domain name requests that are likely to be received from a user device following receipt of a first domain name request from the user device; receive the first domain name request from the user device, the first domain name request including an indication of a first domain name; process the first domain name using the model to determine a set of one or more predicted domain names; send a request to a domain name categorization server over a communications network, the request including the first domain name and the set of one or more predicted domain names; receive a response to the request, the response including categorization data for the first domain name and the set of one or more predicted domain names; and perform domain name request filtering based on the categorization data.

Examples of the invention will now be described with reference to the accompanying drawings:

BRIEF DESCRIPTION OF THE DRAWINGS

FIG. 5 is a schematic diagram showing a set of one or more rules and categorization data according to examples;

DETAILED DESCRIPTION

Figure 1:
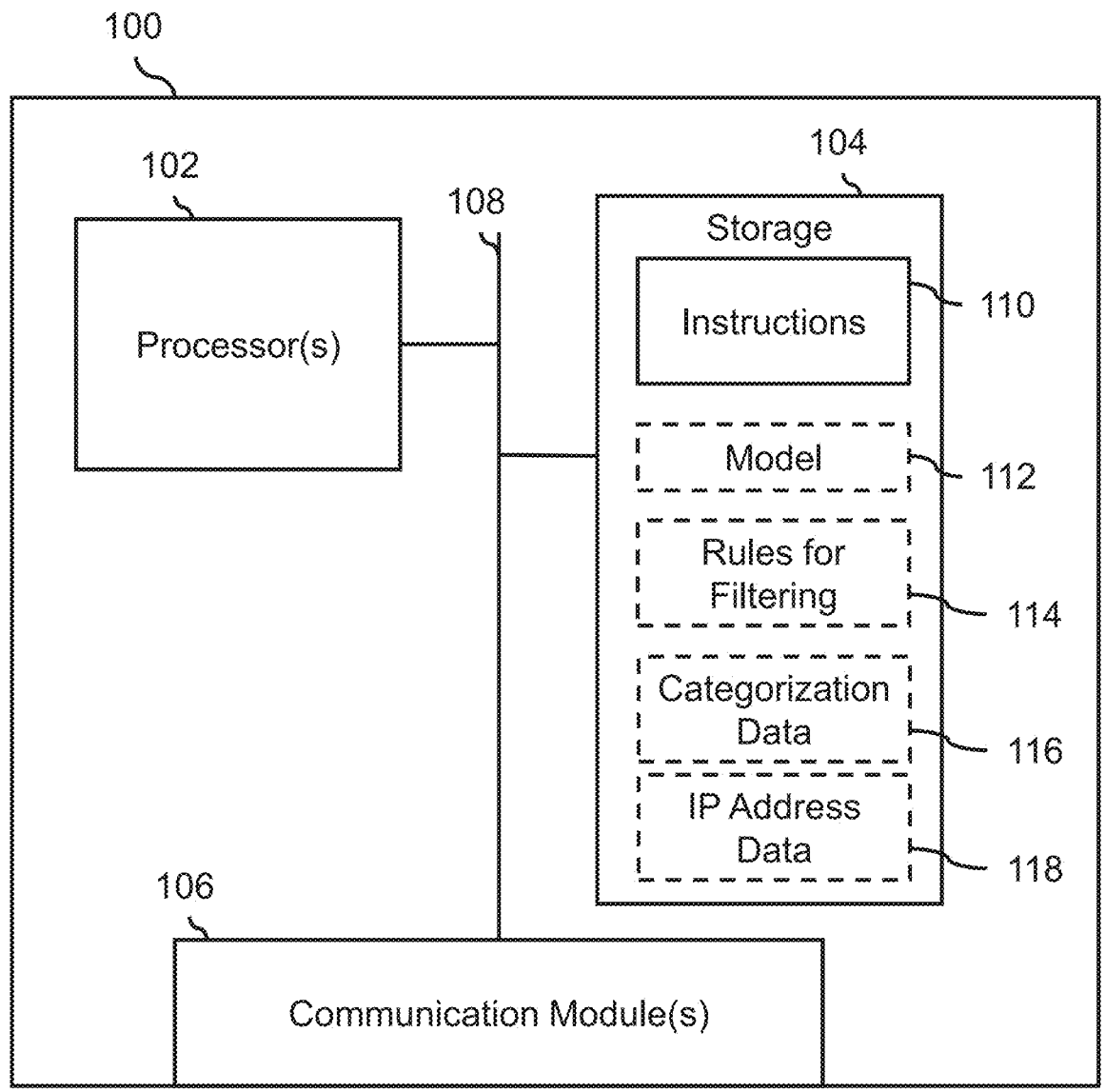
FIG. 1 is a schematic diagram showing the main components of a network management device in accordance with examples.

Wireless-Fidelity (Wi-Fi) networks are used in various environments, including homes, businesses, educational institutions, government organisations, public services, and others. Wi-Fi networks are wireless local area networks (WLAN) that use radio waves to connect devices to each other, and the internet. Wi-Fi is a technology that allows electronic devices like computers, smartphones, and tablets to exchange data wirelessly over a computer network, including high-speed internet connections.

Wi-Fi networks are managed through a combination of hardware devices and software protocols to ensure efficient and secure wireless communication. Wireless Routers and Access Points (APs) are the physical devices that manage the wireless network. Routers and access points control the distribution of data between devices on the local network and the wider internet. They transmit and receive data using radio frequency signals. Some routers and access points allow administrators to manage the network remotely, providing flexibility in configuration and troubleshooting.

One challenge in managing network traffic is the filtering of domain name requests. This is important for a number of reasons, such as to prevent access to certain types of content, for security reasons, to comply with regulations, or to manage network bandwidth. Such filtering may be based on particular categories of requested domain names. The category of a given domain name may indicate, for example, the type of content associated with the domain name, or its security characteristics.

However, determining a category for each requested domain name can be time-consuming and can add a significant delay to the process of accessing a resource. This delay can be particularly noticeable for user devices, which may have to wait for data indicating the domain name category to be received before they can access a resource. Due to the large number of domain names that are in use, categorization of domain names may be offered as a cloud-based service. Storing, updating, and maintaining a database that can be used to determine a category of a given domain name is computationally and resource intensive, and hence impractical to implement in a Wi-Fi network, such as that deployed in a home, business, or educational institute.

Moreover, the current methods for managing domain name requests are reactive in nature. They wait for a user device to send a domain name request, then obtain the categorization data and filter the request accordingly. This reactive approach can be inefficient and can result in significant delays in accessing resources.

Current methods for managing domain name requests do not effectively take into account the temporal correlation between multiple domain name requests from the same user device. For example, a user device may send a series of domain name requests in quick succession, each for a different resource. The current methods would treat each of these requests individually, which can result in redundant processing and unnecessary delays.

Network Management Device

FIG. 1 depicts a network management device 100. The network management device 100 may be configured to enable user devices to access resources hosted on one or more further devices over a communications network, wherein access to these resources is filtered according to domain name categorization. The network management device 100 comprises at least one processor 102, storage 104, and in some cases one or more communications modules 106. The processor(s) 102, storage 104, and communication module(s) 106 are connected over a communication channel, such as a bus 108, allowing them to communicate with each other.

The storage 104 stores a set of computer-executable instructions 110 for executing a method 300, which will be described further below with respect to FIGS. 2 to 7. The storage 104 may also be suitable for storing other types of data such as instructions 112 for implementing a model and/or a set of one or more rules 114, as will be described further below. In some examples, the storage 104 may also be capable of storing categorization data 116 and/or IP address data 118. The storage 104 may include any combination of volatile and non-volatile storage, for example, a combination of read-only memory (ROM) and one or more types of random-access memory (RAM), such as dynamic RAM, synchronous RAM, and so forth. ROM may be included in the form of both disc-based (e.g., hard drive) or flash memory (e.g., solid-state drive(s)).

The processor(s) 102 may include any suitable combination of processing circuitry configured to execute the instructions 110. The processor(s) 102 may include one or more general purpose processors, such as central processing units (CPU), and/or application specific processing circuitry or processing units. The one or more communications modules 106 may be configured to enable communication with one or more further computing devices, for example, as part of a network. The communications module(s) 106 may comprise wireless and/or wired communications modules to enable at least one of wired LAN and wireless LAN connectivity. These communications modules 106 may implement known protocols and standards such as Wi-Fi, Bluetooth, Ethernet, and so forth. The network management device 100 may be capable of communicating over both local and wide area networks via the communications module(s) 106.

The model, as may be provided, or implemented, according to the instructions 110 stored in within the network management device 100, is used for predicting one or more domain names associated with domain name requests to be generated by a user device. The computer-executable instructions 110, when executed by the processor 102, cause the network management device 100 to provide the model. The network management device 100 receives a domain name request from a user device, the domain name request including an indication of a first domain name, and processes the first domain name using the model to determine a set of one or more predicted domain names.

The network management device 100 sends a request to a domain name categorization server over a communications network, with the request including the first domain name and the set of one or more predicted domain names. A response is then received, which includes categorization data 116 for the first domain name and the set of one or more predicted domain names. The network management device 100 performs domain name request filtering based on this categorization data 116. Domain name request filtering is used to manage the user device's access to resources hosted on servers associated with the domain names. The domain name request filtering may be based on one or more rules 114. These rules 114 may be provided within the network management device 100 or they may be externally associated with the user device.

The processor 102, in conjunction with the computer executable instructions 110, directs the operations of the network management device 100, including providing the model according to the instructions 110, receiving and processing domain name requests, sending requests and receiving responses, and performing domain name request filtering. The various operations of the network management device 100 as described above provide an effective solution for managing and filtering domain name requests in a network environment.

The network management device 100 may be applied in various contexts including, without limitation, in home networks, business networks, and government and private networks. Furthermore, the model implemented by the network management device 100 may employ various machine learning techniques or algorithms to generate the set of predicted domain names, providing adaptability and accuracy in predicting domain name requests.

Network Architecture and Domain Name Management

Figure 2:
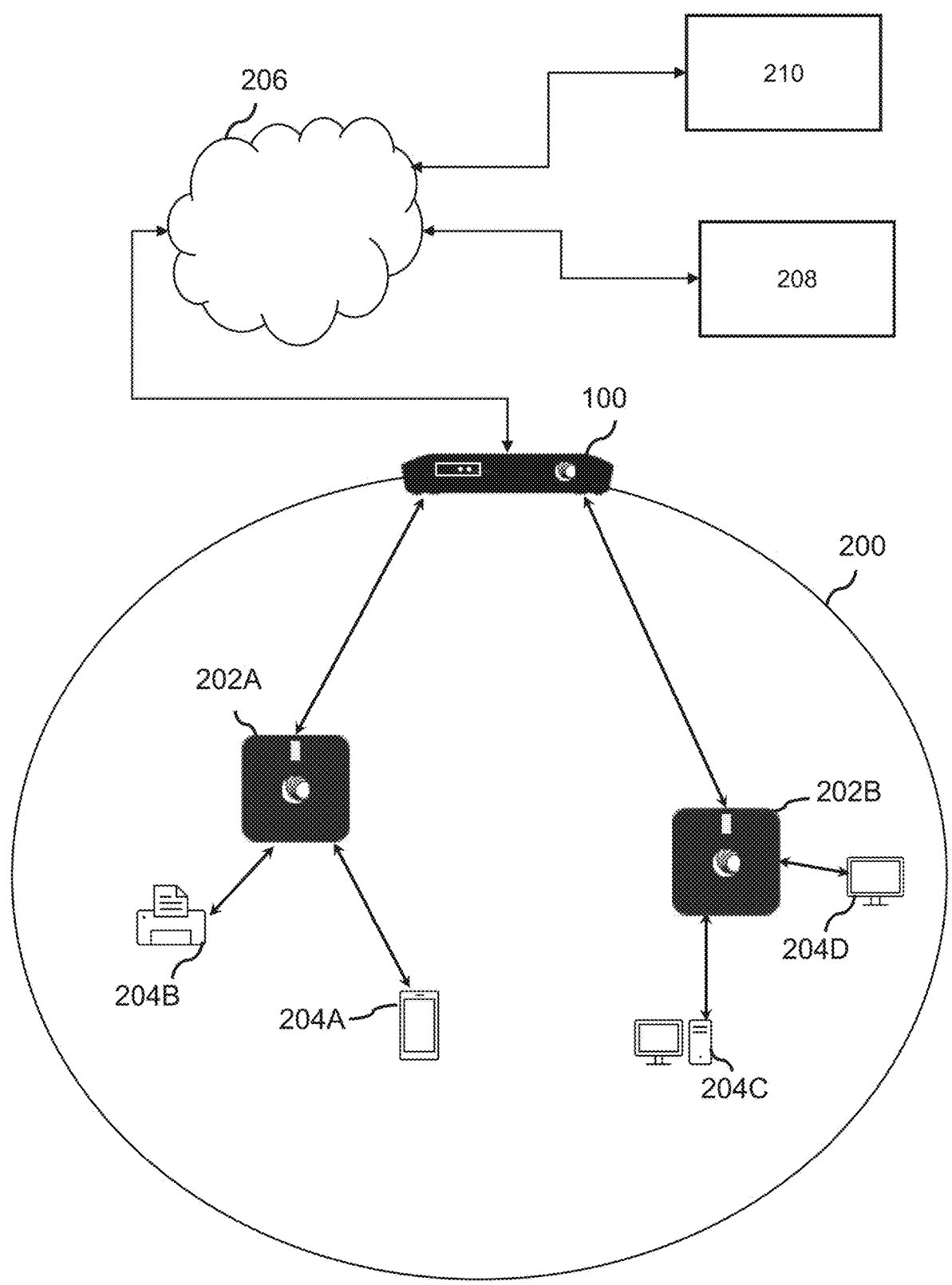
FIG. 2 is a schematic diagram illustrating a configuration of a local network and the interaction between a user device, a network management device, and a domain name categorization server according to examples.

FIG. 2 illustrates a schematic representation of a network architecture that includes a plurality of user devices 212A to 212D connected in a wireless local network 200, such as a Wi-Fi network. The plurality of user devices 204A to 204D are provided access to a communications network 206 by a network management device 100 which may be a router or other type of network edge device. The network management device 100 may provide one or more network management functions necessary to provide access to the communications network 206, including authentication, security, network address translation, port forwarding, and the like. The user devices 204A to 204D can be various types, including personal computers, desktops, laptops, smartphones, and other internet-enabled devices. The communications network 206 can be a wide area network, such as the Internet, or any other suitable network.

The network management device 100 may communicate with the user devices 204A to 204D via access points 202A and 202B. For example, in large Wi-Fi networks, access points 202A and 202B may be used to extend the range and coverage of the Wi-Fi network 200. Access points 202A and 202B may additionally be used to offload some of the network management functions, such as device authentication, to free up resources of the network edge device 208. Communications from the user devices 204A to 204D may be transmitted amongst the other user devices 204A to 204D and with the communications network 206 via the access points 202A and 202B.

When a user device 204A attempts to access a resource hosted on a further device over the communications network 206, such as a webpage, the user device 204A generally first obtains an IP address used to route communications to the further device hosting that resource. To this end, the user device 204A sends a domain name request that includes a domain name to a DNS server 210 which is configured to resolve the domain name and provide an associated IP address. The domain name request is sent via the network management device 100. The IP address is returned to the user device 204A and can be used to establish a connection with a further device over the communications network 206 that is hosting the resource.

In certain Wi-Fi networks, user devices 204A to 204D may be restricted from access certain resources. For example, in Wi-Fi network deployments in a school it may be desired to restrict access to resources which are considered to be too mature for students, or which are typically associated with uses that are undesirable when connected to a school network, such as online games, or social media.

Restrictions to web resources may also be implemented for the purpose of managing the security of the Wi-Fi network. In a business, or government, Wi-Fi network deployment, user devices 204A to 204D may be prevented from accessing resources which are associated with security risks. For example, web pages that have been associated with data leaks, or are hosted by devices that are associated with undesirable organisations or entities that may be restricted.

To this end, the network management device 100 may interface with a domain name categorization server 208 over the communications network 206. The domain name categorization server 208 is configured to categorize domain names associated with resources that the user devices 204A to 204D may request to access. The categorization data 116 may include information about the domain name's security characteristics, associated security protocols, utility, usage patterns, and maturity level.

The categorization data 116 may be used to filter domain name requests from the user devices 204A to 204D. If it is determined, based on the categorization data 116, that a user device 204A is attempting to access a resource that it is not entitled to, for example, that is restricted according to a policy for the Wi-Fi network 200, then the domain name resolution is not provided to the user device 204A for that domain name. On the other hand, if the user device 204A is entitled to access the resource, then the network management device 100 may interface with a Domain Name System (DNS) server 202 over the communications network 206 to provide an associated IP address to the user device 204A.

The intermediate step of obtaining categorization data 116 has been found by the inventors to be a source of undesirable latency when managing a Wi-Fi network. Domain name categorization services are typically provided as cloud-based services. Due to the large, and ever increasing, number of domains in use implementing a database, or other service, that can categorize domain names requires prohibitive computational resources which generally are not available in Wi-Fi networks. As such, to provide domain name filtering, network management devices 100 generally have to communicate with domain name categorization servers 208 over the internet 206.

Communicating over a wide area network 206 is generally a source of latency. It has also been found that, while certain domain name requests are triggered by a user of a user device 204A, for example, when typing in the domain name of a particular web page to a web browser, a large number of domain name requests are triggered automatically by user devices 204A to 204D. When a particular web page is requested by a user device 204A, a plurality of additional domain name requests may be automatically sent to access specific additional resources which may be needed to load the web page. For example, a single web page may include a plurality of embedded content links which are used to access and load content which is subsequently displayed with the web page to the user device 204A. This may include videos, images, web-based applications, and the like. Other domain name requests are initiated by background processes needed to load the webpage and any additional services associated therewith, such as security, encryption, analytics, and other such services.

In systems where domain name filtering is implemented, each of these subsequent domain name requests will also be subject to the same categorization and filtering process as the initial, user triggered, domain name request. It is not uncommon, for example, that requesting a single web page may trigger more than twenty additional domain name requests. In this case, the latency introduced by domain name categorization and filtering when accessing a single web page may be multiplied by more than twenty times. This can cause severe degradation of services in the Wi-Fi network and administrators may decide to turn off domain name categorization and filtering features, leading to a reduction in security, privacy, and network control.

The network management device 100 uses a predictive model to anticipate domain name requests from the user devices 204A to 204D, sends these anticipated requests to the domain name categorization server 204 for categorization data 116, and uses this data 116 for filtered access to resources by the user devices 210. This predictive and categorization process aims to improve the efficiency and security of network traffic within the system.

Domain Name Prediction and Filtering Process

Figure 3:
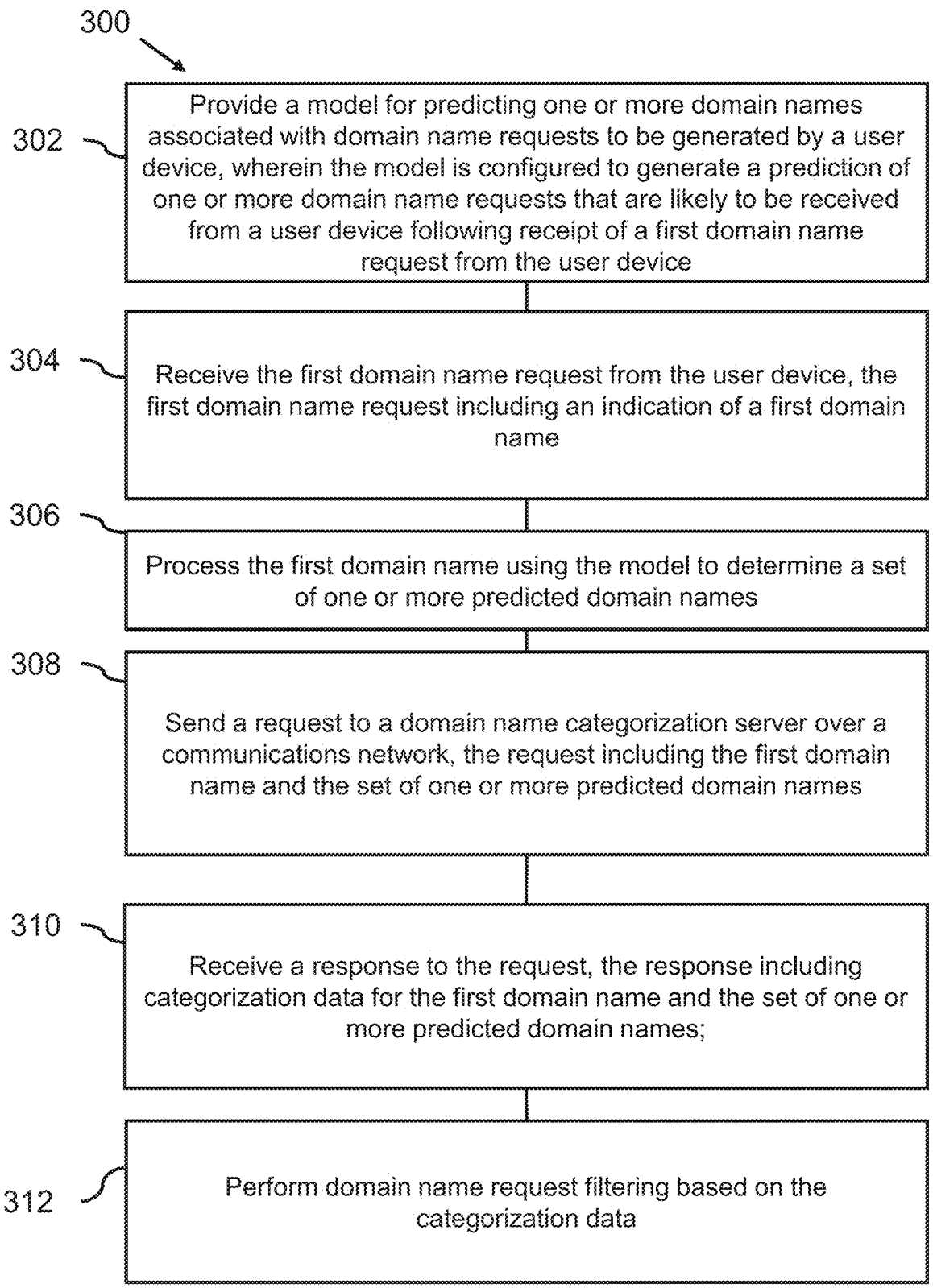
FIG. 3 is a flowchart showing a method for enabling user devices to access resources hosted on one or more further devices over a communications network, according to examples.
Figure 4:
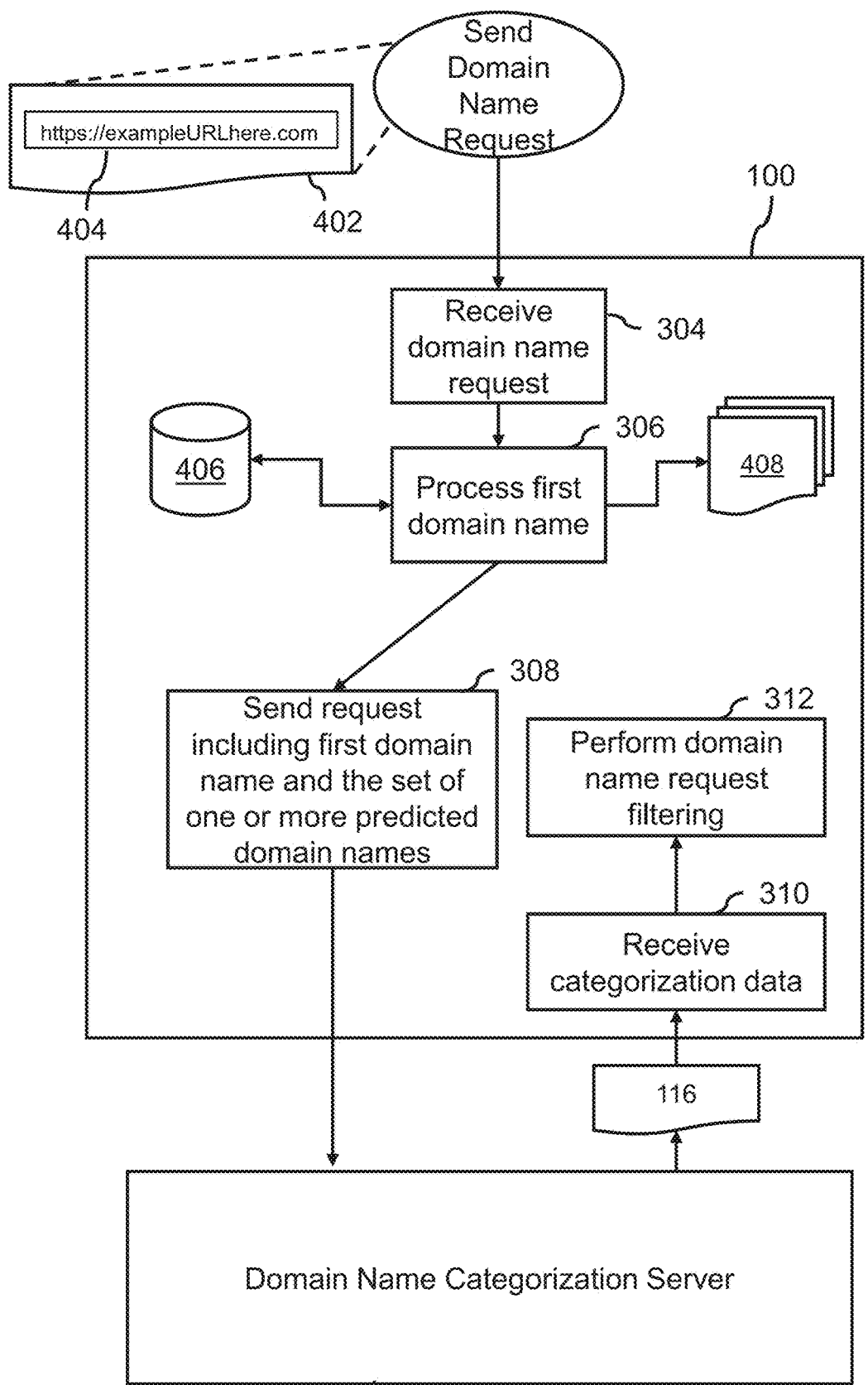
FIG. 4 is a schematic diagram showing the method for enabling user devices to access resources hosted on one or more further devices over a communications network, according to examples.

The network management device 100 is configured to perform a method 300 shown in the flow diagram of FIG. 3, based on the instructions 110. The method 300, and particularly the interfaces between the network management device 100, other computing devices, and the data generated during implementation of the method 300 are shown in the schematic flow diagram of FIG. 4. The method 300 will now be described with reference to FIG. 3 and FIG. 4. The method 300 involves providing 302 the model 406 described above. The model 406 will be described in more detail below with respect to FIGS. 6 and 7. The method 300m comprises receiving 304 a first domain name request 402 from a user device 204A. This request will include an indication of a first domain name 404. The first domain name 404 is processed 306 using the model 406 to generate a set of one or more predicted domain names 408.

The one or more predicted domain names 408 represent domain names that are likely to be requested by the user device 204A following the first domain name request 402. These one or more predicted domain names 408 may include, for example, domain names that are associated with further resources that are accessed in response to a request to access the resources associated with the first domain name 404. As discussed above, this may include content loaded for a webpage, but may also include requests to access one or more authentication, or security services that the web page implements, or any other subsequent domain name requests that may predictably follow a first domain name request 402.

The network management device 100 sends 308 a request to a domain name categorization server 208. This request includes the first domain name 404 and the set of one or more predicted domain names 408. The categorization server 208 responds with categorization data 116 for these domain names, which is received 310 by the network management device 100. This categorization data 116 can include, among other things, indications of any one or more of domain name security characteristics, security protocols, utility, usage patterns, and maturity levels. Domain name requests can then be filtered based on the categorization data. The network management device 100 may then perform 312 domain name request filtering based on the categorization data 116.

In some examples, domain name request filtering may be performed by the network management device 100 accessing a set of one or more rules 106, such as the rules 114 stored in the storage 104. In other examples, the rules 114 may be stored in an external device attached to the network 200 and which is accessed remotely by the network management device 100. The set of one or more rules 114 may then be compared with the categorization data 116 for the first domain name 404, and the user device 204A may be allowed to access resources associated with the first domain name 404 in dependence on an outcome of the comparing of the categorization data 116 with the set of one or more rules 114. Allowing access to a resource associated with the first domain name may involve providing an IP address associated with the first domain name 404 to the user device 204A.

As described above, following receipt of a domain name request from a user device 204A, the network management device 100 may be configured to send a request to a DNS server 210 to obtain an IP address associated with that domain name. In the present example, the network management device 100 may send domain name request to the DNS server 210 for at least the first domain name 404. The network management device 100 may store IP address data received from the DNS server 210 in response to this request. Providing IP address data associated with the first domain name 404 to the user device 204A may be performed in dependence on whether it is determined that the user device 20A is allowed to access the resource associated with the first domain name 404.

If it is determined that the user device 204A is not allowed to access the resource, then the network management device 100 may not provide the relevant IP address data, associated with the first domain name 404, to the user device 204A. If it is determined that the user device 204A is allowed to access the resource associated with the first domain name 404, based on an outcome of the comparison, then the network management device 100 may provide the user device with the relevant IP address data associated with the first domain name 404. This allows the user device 204A to access the resources linked with the first domain name.

Domain name filtering for a given domain name may comprise generating an indication of whether the user device 204A is allowed to access resources associated with the given domain name. The network management device 100 may record an outcome of the comparison of the categorization data 116 for the given domain name with the set of one or more rules 114 and generate an indication associated with the user device 204A and the given domain name. This may allow future filtering of domain name requests to be implemented without need to perform further requests for categorization data and subsequent comparisons between this data and the set of one or more rules 114.

Sending the domain name request to the DNS server 210 for at least the first domain name 404 may be triggered based on the receipt of the first domain name request 402 from the user device 204A. By sending the request for domain name address resolution to the DNS server 210 for at least the first domain name once it is received by the user device 204A, it is possible to prefetch the relevant IP address data concurrently with obtaining the categorization data 116. If the user device 204A is allowed to access the resources associated with the first domain name 404, then the IP address data associated with the first domain name 404 may be served to the user device 204A when it is determined that the user device 204A is allowed to access the resources associated with the first domain name, thereby mitigating potential latency.

In other examples, the domain name request for domain name resolution of at least the first domain name 404, sent by the network management device 100, may be triggered based on receipt of the categorization data 116. In this way it may be possible to briefly delay the request to the DNS server 210 for domain name resolution, until the categorization data 116 has been received, so as to manage the bandwidth of the network management device 100.

Sending the domain name request to the DNS server 210 for at least the first domain name may be dependent on a determination that the user device 204A is allowed to access the resource associated with the first domain name 404. In this way it becomes possible to reduce the number of external requests to the DNS server 210 that are sent, thereby reducing overhead on the network management device 100 and providing an increase in potential bandwidth capacity. If the user device 204A is not allowed to access resources associated with the first domain name 404, then an associated IP address may not be determined or provided to the user device 204A.

Domain name filtering may also be performed for any one or more of the set of predicted domain names 408. To this end, categorization data 116 associated with a given predicted domain name may be compared to the set of one or more rules 114 to determine whether the user device 204A is to be allowed to access resources associated with the predicted domain name. Domain name filtering for the set of one or more predicted domain names may be performed substantially concurrently with the domain name filtering of the first domain name. For example, the process for domain name filtering of the one or more predicted domain names may be triggered by the same event, such as receipt of the categorization data 116.

Indications of the outcome of the comparison of the set of one or more rules 114 with categorization data 116 associated with the predicted domain names may be stored in advance of the user device 204A sending domain name requests associated with the predicted domain names. In this way, the network management device 100 may predetermine whether the user device 204A is allowed to access the set of one or more predicted domain names 408 and hence react to subsequent domain name requests without the added latency of performing domain name categorization and filtering. By proactively categorizing and filtering domain names that are likely to be requested from the user device 204A, the network management device 100 is able to reduce latency felt by user devices and manage bandwidth in the network more effectively.

The network management device 100 may also be configured to send domain name requests to the DNS server 210 for at least some of the set of one or more predicted domain names. IP address data 118 received in response to the domain name requests sent to the DNS server for the one or more predicted domain names may be stored in the storage 204. IP address data 118 associated with at least some of the set of one or more predicted domain names may be provided to the user device 204A in dependence on a determination of whether the user device 204A is allowed to access the resources associated with at least some of the one or more predicted domain names.

Sending domain name requests to the DNS server 210 for at least some of the set of one or more predicted domain names may be triggered based on receiving the first domain name request 402 from the user device 204A. As briefly discussed above, triggering the process for domain name categorization and/or domain name resolution for the set of one or more predicted domain names at the same time as the first domain name may reduce latency for user devices. Reducing this latency enables the implementation of domain name filtering to be performed without a degradation in performance for user devices 204A to 204D. Thereby allowing stricter security and privacy-based filtering of domain names to be implemented while mitigating, or eliminating, any reduction in service for the user device 204A to 204D. In other examples, sending domain name requests to the DNS server 210 for at least some of the set of one or more predicted domain names is triggered based on receipt of the categorization data 116.

Alternatively, or additionally, sending domain name requests to the DNS server 210 for at least some of the set of one or more predicted domain names 208 may be triggered based on a determination that the user device 204A is allowed to access the resources associated with the first domain name 404. If the user device 204A is not allowed to access the resources associated with the first domain name 404, then the likelihood that the user device 404 will send a domain name request for any of the one or more predicted domain names 408 decreases. By withholding the domain name requests to the DNS server 210 in this way, the network management device 100 may still prefetch IP address data 118 for domain name requests that are likely to be received from the user device 204A, while also reducing the number of domain name requests that are sent to the DNS server 210 for domain names that will not be requested by the user device 204A.

In some examples, the domain name requests sent to the DNS server 210 for at least some of the set of one or more predicted domain names 408 may be dependent on a determination that the user device 204A is allowed to access the resources associated with those at least some of the set of one or more predicted domain names 408. In this way the network management device 100 may prevent domain name requests being sent to the DNS server 210 for predicted domain names which are not needed, as the user device 204A is not to be provided with associated with IP address data 118, while still prefetching IP address data 188 for domain names the user device is allowed to access.

As briefly discussed above, categorization data 116 associated with a given domain name, such as the first domain name 404 or the set of one or more predicted domain names 408, may include an indication of a security characteristic associated with the given domain name. The security characteristics may, for example, include a score representing a relative security of the domain name, wherein a low score indicates that the domain name is relatively insecure, and a high score indicates that the domain name is relatively secure, or vice versa. A security characteristic may include an indication of, or be dependent on, whether resources associated with the domain name have been subject to a security breach or cyberattack. In this way it is possible to manage the accessibility of domain names for user devices 204A to 204D in a manner that aims to increase the security of service provided to the user devices 204A to 204D.

The categorization data 116 may include an indication of a security protocol associated with the given domain name. For example, web pages may be associated with respective security protocols. Hypertext Transfer Protocol Secure (HTTPS) is an extension of Hypertext Transfer Protocol that uses encryption for secure communication. The categorization data 116 for a given domain name may indicate whether the domain uses protocols such as HTTPS which provide greater security than other protocols such as HTTP.

Categorization data 116 may additionally, or alternatively, include an indication of a utility associated with the respective domain name. The utility of a domain name may be an indication of a type of service offered through or associated with the domain name. For example, domains on which online or internet gaming are provided may be associated with a gaming utility. Domain names which are associated with educational or business services may be associated with a respective utility. Other examples may include, but are not limited to, online shopping, messaging services, research databases, library archives, private companies' websites, government websites, social media, news, video streaming, and so forth.

An indication of usage patterns associated with a given domain name may be included in the categorization data 116. A usage pattern may, for example, include a relationship between traffic volume and certain time periods, a time period being either a specific instance of a time period or a periodic interval of time that may reoccur. Filtering domain name requests based on such usage patterns may make it possible, for example, to filter access to domain names that are typically associated with use outside of business hours, or for long periods of time.

A maturity level associated with a given domain name may be indicated in the categorization data. For example, an age rating may be used such that access to domain names that are typically associated with mature content may be restricted, or filtered, in certain settings such as at school deployments.

The set of one or more rules 114 that are used in filtering of domain name requests may be associated with the user device. Which is to say, that the set of one or more rules 114 may be configured specifically to filter domain name requests for a given user device 204A. An administrator of the local network 200 may, for example, set the one or more rules for the user device 114.

Alternatively, or additionally, the set of one or more rules 114 may be associated with a plurality of user devices 204A to 204D. The set of one or more rules 114 may be used to filter domain name requests for a plurality of user devices 204A to 204D in the network 200. In some examples, this may include associating the set of one or more rules 114 with a specific set of devices in the network 200. Alternatively, the set of one or more rules 114 may be across all user devices 204A to 204D in a local Wi-Fi network 200. This may be used in a school or business environment when domain name filtering is to be applied to all user devices.

The set of one or more rules 114 may specify one or more categories of domain name that the user deice 204A is not entitled to access. If it is determined that the first domain name is associated with any one or more of the specified categories of domain name in the comparison, then the user device is not allowed to access the resources associated with the first domain name. If it is determined that the first domain name is not associated with the one or more specified categories then the user device is allowed to access the resource associated with the first domain name.

Turning to FIG. 5, specific examples of the categorization data 502 and the set of one or more rules 504 are shown. In the example shown, the set of one or more rules 504 includes, for each of the user devices 204A to 204D, an indication of one or more allowed categories, and an indication of one or more restricted categories of domain name. It will be appreciated that in some cases, certain user devices 204A to 204D may not be associated with any restricted categories. In the present example, each user device 204A to 204D, identified according to a device ID, is associated with a respective set of one or more rules. When performing domain name filtering a specific set of one or more rules may be accessed according to which of the plurality of user devices 204A to 204D sent the first domain name request. The device ID shown in the set of one or more rules may include, for example a MAC address associated with a user device 204A to 204D. When accessing the set of one or more rules to perform domain name request filtering, the network management device 100 may identify the relevant one or more rules by matching the MAC address of the user device 204A that sent the first domain name request 402, and the respective rules in the set of one or more rules 504. It will be appreciated that while a separate record is shown for each of the plurality of user devices 204A to 204D, these rules may be applied across all devices in the network 200 and hence an indication of the device ID is not needed. In the example shown in FIG. 5, the categorization data 502 includes, for a plurality of domain names, an indication of a respective category. Some domain names may be associated with two or more categories. According to the example shown, comparing the categorization data for a given domain name with the set of one or more rules may involve comparing the categories associated with the given domain name with the allowed and/or restricted categories defined in the rules.

Predictive Domain Name Management System

Figure 6:
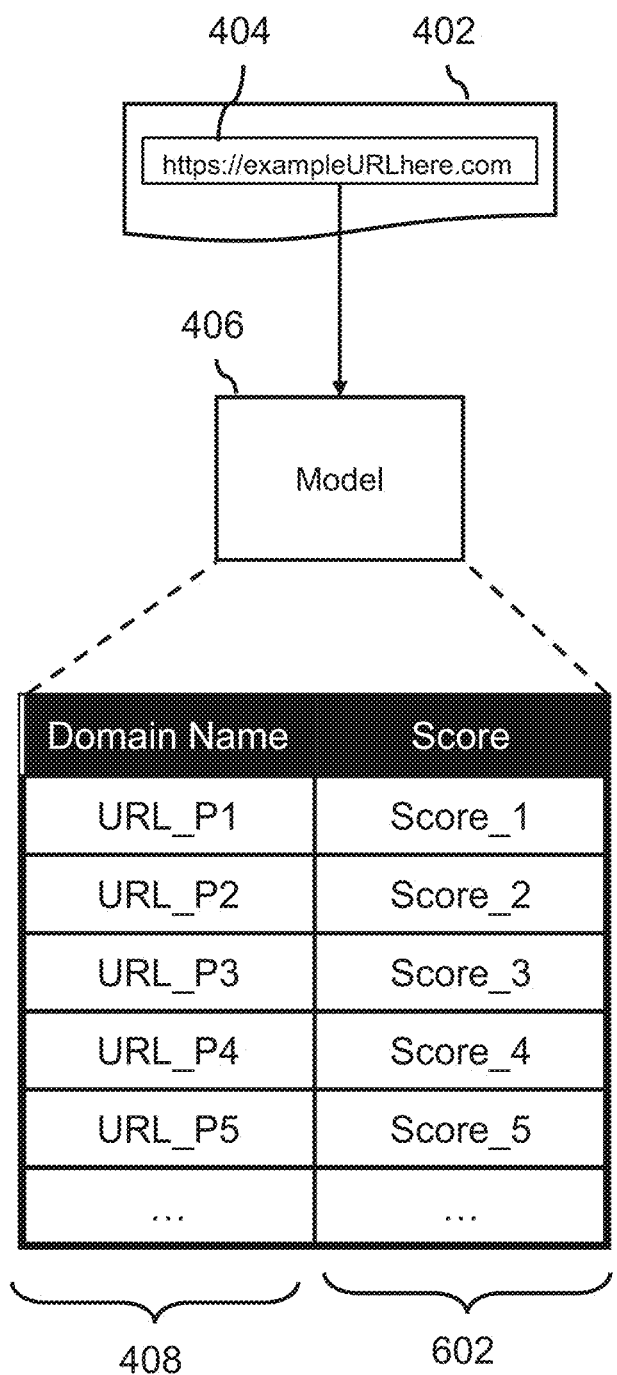
FIG. 6 is a schematic diagram showing an example of the function of the model according to examples.

The network management device 100 uses a predictive model 406 to anticipate domain name requests. Turning now to FIG. 6, an example of model's operation is shown. In this example, the model 406 is configured to receive the first domain name 404 and to process the first domain name 404 to generate a set of predicted domain names 408 and scores 602 associated with respective predicted domain names 408. The score 602 associated with a said predicted domain name 408 may be representative of a likelihood that the user device will send a domain name request including the said predicted domain name following the first domain name request.

When sending the request for domain name categorization data 116, the network management system 100 may select a set of one or more of these predicted domain names 408 to include in the categorization data request. For example, the network management system 100 may select a predetermined number of predicted domain names from the predicted domain names generated by the model. In this case, the network management device 100 may select the predetermined number of predicted domain names from a list ranked according to the scores 602. In this way it is possible for the network management device 100 to prioritize those domain names which are most likely to be requested by the user device 100 following the first domain name request 402. In other examples, the network management device 100 may use a predetermined threshold score based on which the set of one or more predicted domain names are selected. In other examples, the network management device 100 uses a variable threshold such as may be determined based on a statistical analysis of the scores. For example, the network management device 100 may select predicted domain names having a score in the top 5% or 10%, or may determine a threshold score based on an analysis of the distribution of the scores across the predicted domain names.

Figure 7:
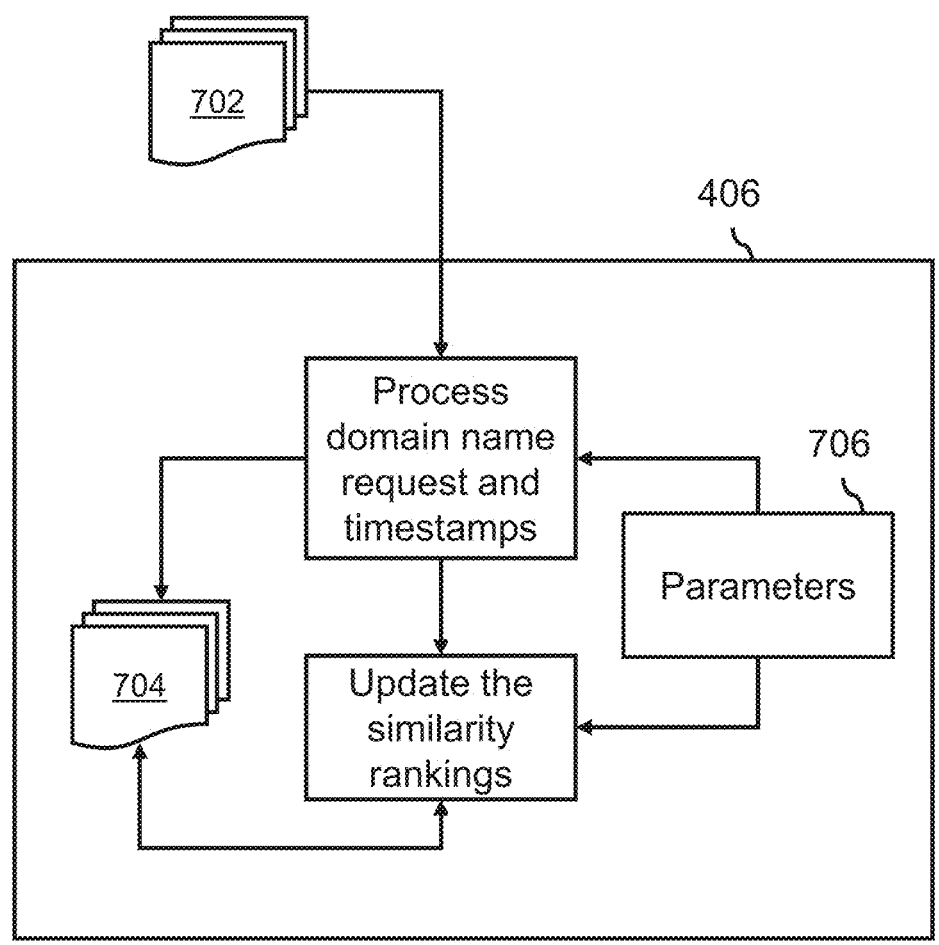
FIG. 7 is a schematic diagram showing a process for training the model according to examples.

FIG. 7 shows schematically, a process for training the model 406. The model 406 may be trained by collecting domain name requests 702 from one or more user devices, each domain request being associated with a MAC address of the respective device and a timestamp of when the domain name request was generated. To this end, the network management device 100 may store records of the domain name requests which are sent from user devices 204A to 204D via the network management device 100. The domain name requests 702 may be collected over predetermined period, such as one day, one week, one month, or other suitable time periods. In other examples, a predetermined number of domain name requests 702 may be collected. For example, training the model 406 may comprise collecting domain name requests 702 and, once a predetermined number of domain name requests have been received, using the domain name requests 702 for the training steps described below.

The model 406 may process the collected domain name requests and generate a set of similarity rankings 704 between domain names based on timestamp proximity of associated domain name requests received from the same device. Domain names associated with domain name requests received from a said user device are given a higher similarity ranking where the timestamps associated with the respective domain name requests are closer together, and a lower similarity ranking where the timestamps associated with the respective domain name requests are further apart. These similarity rankings 704 are stored and used to generate domain name predictions based on a given domain name.

The set of similarity rankings 704 may periodically be updated based on further collected domain name requests. Overtime, the association between domain names may change. Websites may evolve overtime as they are updated with new content, new features, and in response to changes in resources and where the websites and their associated resources are hosted. Periodically updating the similarity rankings 704 may allow the network management device 100 to maintain a standard of service as websites evolve.

A number of parameters 706 may be used to tune, and configure, the operations of the model 406. For example, generating the set of similarity rankings 704 may be dependent on a timestamp proximity parameter. The timestamp proximity parameter may be associated with a predetermined cut off time period within which timestamp proximity is measured. In some cases, the timestamp proximity parameter may define the cut off time period. In this way, the model may only generate similarity rankings between domain names that are requested in close proximity, and within the time period cut off.

Generating the similarity rankings 704 may additionally, or alternatively, be dependent on a decay factor. In this way, a similarity ranking 704 between two domain names may be configured to decay, or decrease, over time in accordance with the decay factor. The decay factor may define a rate of decay for the similarity rankings 704, wherein the rate of decay may be defined by the frequency at which a similarity ranking is reduced, and the amount by which it is reduced each time. This may prevent the model 406 from maintaining older associations between domain names that may no longer be relevant.

The model 406 may be trained based on domain name requests from user devices in a plurality of networks. For example, domain name requests, timestamps, and relevant device identification information, such as a MAC address, may be collected in a plurality of local Wi-Fi networks 200. The network management device 100 may receive training data derived from these collected domain name requests and use this training data to train and/or update the model 406. In some examples, the training data may include the raw data of the collected domain name requests. In other examples, the training data may be anonymised to remove any device specific information such as the device identification information like a MAC address. To this end, the training data may be pre-processed such that the domain name requests and time stamps are arranged or grouped into domain name requests associated with respective user devices. The training data may not include domain name requests, but may instead represent updates to be made to the similarity rankings 704.

Alternatively, the model 406 may be trained prior to being deployed in the network management device 100. For example, a single network management device, or cloud-based service, may collect domain name requests from a plurality of Wi-Fi networks 200 and train the model 406. The model 406 may then be provided to the network management device 100. Further updates of the model 406 may be delivered to the network management device 100 from on a centralized updating process, in which the process of updating the similarity rankings may be performed centrally and distributed to a plurality of network management devices 100.

In some examples, the model 406 may be region specific. For example, the model 406 may be trained based on domain name requests collected from Wi-Fi networks 200 in a specific geographic region, such as a country. It has been found that the relationship between domain name requests which are likely to follow a first domain name request may be region specific in some cases. For example, region dependent versions of certain websites may store relevant web page content on local servers. This may be due to local data handling and/or processing requirements. By configuring the model to be region specific, the accuracy of predictions for a given region may be increased. Additionally, training the model 406 may be more efficient as less resources are spent in training the model 406 to generate predictions for domain names which are rarely, or never, requested in a respective region.

In some cases, more granular delineations of a region may be used. For example, the model 406 may be trained to generate predictions of domain name requests based on the collected domain name requests from a specific region in a country, such as a department, a county, a state, a city, and so forth. In this way the model 406 may be trained more specifically on locally popular domains. Training the model 406 based on more popular domains for a given region, may enable the model 406 to be trained more efficiently, by reducing the need to train the model 406 to generate predictions for domain names which are rarely, or never, requested in a given region.

In some examples, the model 406 may be implemented using a machine learning classifier. The machine learning classifier can be trained using a variety of machine learning techniques, such as supervised learning, unsupervised learning, reinforcement learning, or deep learning. The training data can include a set of domain names, timestamps, MAC addresses, and associated similarity scores that have been previously generated and validated. The machine learning classifier can also be updated or retrained periodically to improve the accuracy of the predictions over time.

This architecture and process provide a flexible and efficient method for managing domain name requests in a network. By using a predictive model and categorization data, the system can improve the speed and security of network traffic, and provide a better user experience for the users of the user devices 210.

In some examples, the set of one or more predicted domain names generated by the model 406 may be dependent on a MAC address associated with the user device 204A. For example, the model 406 may be trained to generated predictions of domain names which are dependent on specific devices. For example, the domain names requested by a said user device 204A following a first domain name request may be different to the domain names requested by another, different, user device 204B following a similar first domain name request. This may be because different types of devices, such as those running different operating systems, or using different software or browsers, may generate different domain name requests when attempting to access the same first domain. In this example, the method 300 may comprise determining a media access control (MAC) address associated with the user device. Processing the first domain name using the model 406 may then include processing the MAC address associated with the user device. The set of one or more predicted domain names that are generated by the model may then be dependent on the MAC address of the user device 204A.

Figure 8:
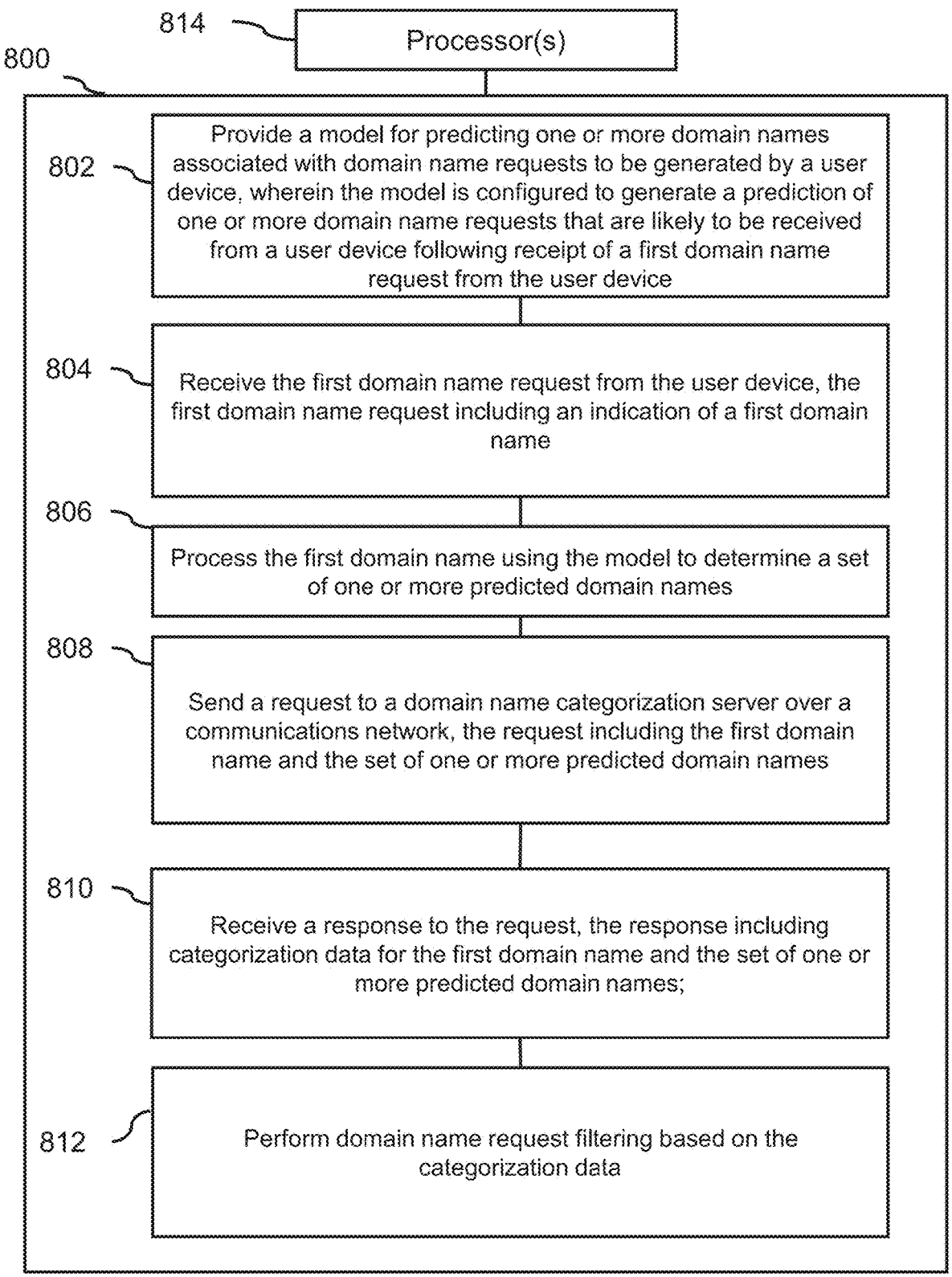
FIG. 8 is schematic diagram showing a computer-readable storage medium according to instructions.

FIG. 8 illustrates a schematic diagram of a non-transitory computer-readable storage medium 800. This medium is configured to store computer-executable instructions 802 to 812. When executed by a processor 814, these instructions 802 to 812 enable the implementation of a method of network device management 100 to perform domain name request management.

The processor 814 may comprise one or more processors and can include different types of specific processing circuitry. These can include, but are not limited to, central processing units (CPUs), graphics processing units (GPUs), digital signal processors, or application-specific integrated circuits (ASICs). The specific type and configuration of the processor 814 can be based on the requirements of the system, including processing power, energy efficiency, and other factors.

The computer-executable instructions 802 to 812, when executed by the processor 814, cause the processor(s) 814 to perform the method 300 including providing a model for predicting one or more domain names associated with domain name requests likely to be generated by a user device. A domain name request is then received from a user device and is processed using the model to determine a set of predicted domain names. Further, the instructions facilitate sending a request, including the received and predicted domain names, to a domain name categorization server over a communication network. The system can then receive a response with categorization data for the received and predicted domain names, and perform domain name request filtering based on this categorization data.

The above embodiments are to be understood as illustrative examples of the invention. Further embodiments of the invention are envisaged. For example, in some examples performing domain name request filtering may involve providing at least some of the categorization data to the user deice 204A, including categorization data 116 associated with the first domain name. Allowing the user device 204A to access the resources associated with the first domain name 404 is performed in dependence on an outcome of a comparison of the categorization data 116 with a set of one or more rules for filtering domain names for the user device 204A. The rules may, for example, be stored in the user device 204A. The user device may implement, for example, software or firmware that is configured to perform the comparison of the categorization data with a set of one or more rules. The outcome of the determination may be communicated to the network management device 100 for the purpose of determining whether to allow access to the resources of the first domain name 404. To be allowed access to, the user device 204A may be required to generate a token or key for the network management device 100.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Numbered Clauses

Various aspects of the present disclosure are set out according to the following numbered clauses:

1. A method for enabling user devices to access resources hosted on one or more further devices over a communications network, access to said resources being filtered according to domain name categorization, the method comprising:
    providing a model for predicting one or more domain names associated with domain name requests to be generated by a user device, wherein the model is configured to generate a prediction of one or more domain name requests that are likely to be received from a user device following receipt of a first domain name request from the user device;
    receiving the first domain name request from the user device, the first domain name request including an indication of a first domain name;
    processing the first domain name using the model to determine a set of one or more predicted domain names;
    sending a request to a domain name categorization server over a communications network, the request including the first domain name and the set of one or more predicted domain names;
    receiving a response to the request, the response including categorization data for the first domain name and the set of one or more predicted domain names; and performing domain name request filtering based on the categorization data.

2. The method of clause 1, wherein domain name request filtering comprises: providing at least part of the categorization data to the user device including categorization data associated with the first domain name; and
    allowing the user device to access the resources associated with the first domain name in dependence on an outcome of a comparison of the categorization data with a set of one or more rules for filtering domain names for the user device.

3. The method of clause 1, wherein domain name request filtering comprises:
    accessing a set of one or more rules for filtering domain names for the user device;
    comparing the categorization data for the first domain name with the set of one or more rules; and
    allowing the user device to access the resources associated with the first domain name in dependence on an outcome of the comparing the categorization data with the set of one or more rules.

4. The method of clause 2 or clause 3, wherein the set of one or more rules specify one or more categories of domain name that the user device is not entitled to access, and wherein if it is determined that the first domain name is associated to any one or more of the specified categories of domain name in the comparison, then the user device is not allowed to access the resource associated with the first domain name and if it is determined that the first domain name is not associated with one or more the specified categories then the user device is allowed to access the resource associated with the first domain name.

5. The method of any one of clauses 2 to 4, wherein allowing the user device to access the resources associated with the first domain name includes providing an Internet Protocol (IP) address associated with the first domain name to the user device.

6. The method of any one of clauses 2 to 5, wherein the method comprises:
sending a domain name request for at least the first domain name to a DNS server;
storing IP address data received from the DNS server in response to the domain name request; and
providing IP address data associated with the first domain name to the user device in dependence on whether it is determined that the user device is allowed to access the resource associated with the first domain name.

7. The method of clause 6, wherein sending the domain name request to the DNS server for at least the first domain name is triggered based on:
receipt of the first domain name request from the user device: or
receipt of the categorization data.

8. The method of clause 6, wherein sending the domain name request to the DNS server for at least the first domain name is dependent on a determination that the user device is allowed to access the resource associated with the first domain name.

9. The method of any one of clauses 6 to 8, wherein the method comprises:
sending domain name requests to the DNS server for at least some of the set of one or more predicted domain names;
storing IP address data received in response to the domain name requests sent to the DNS server for at least some of the set of one or more predicted domain names; and
providing IP address data associated with at least some of the set of one or more predicted domain names in dependence on whether it is determined that the user device is allowed to access the resources associate with at least some of the set of one or more predicted domain names.

10. The method of clause 9, wherein determining that the user device is allowed to access the resource associated with a said predicted domain name of the set of one or more predicted domain names involves comparing categorization data associated with the said predicted domain name with the set of one or more rules.

11. The method of clause 9 or clause 10, wherein sending domain name requests to the DNS server for at least some of the set of one or more predicted domain names is triggered based on:
receiving the first domain name request from the user device; or
receipt of the categorization data.

12. The method of clause 9 or clause 10, wherein sending a domain name request to the DNS server for a said predicted domain name is dependent on a determination that the user is allowed to access the resource associated with the said predicted domain name.

13. The method of any preceding clause, wherein the categorization data associated with first domain name and the predicted domain names includes at least one of:

an indication of a security characteristic associated with the respective domain name;
an indication of security protocols associated with the respective domain name;
an indication of a utility associated with the respective domain name;
an indication of usage patterns associated with the respective domain name; and
an indication of a maturity level associated with the respective domain name.

14. The method of any preceding clause, wherein the set of one or more rules are associated with the user device.

15. The method of any one of clauses 1 to 14, wherein the set of one or more rules are associated with a plurality of user devices.

16. The method of any preceding clause, wherein the method comprises determining a media access control (MAC) address associated with the user device and wherein the processing the first domain name using the model to determine the set of one of more predicted domain names includes processing the MAC address associated with the user device, wherein the set of one or more predicted domain names are dependent on the MAC address of the user device.

17. The method of any preceding clause, wherein the model is configured to receive the first domain name and process the domain name to generate a set of predicted domain names and scores associated with the predicted domain names, wherein the score associated with a said predicted domain name is representative of a likelihood that the user device will send a domain name request comprising the said predicted domain name following the first domain name request.

18. The method of clause 17, wherein the model is trained by:
collecting domain name requests from one or more user devices, each domain name request being associated with a MAC address of the respective device and a timestamp of when the domain name request was generated;
generating a set of similarity rankings between domain names based on timestamp proximity of associated domain name requests received from the same user device, wherein domain names associated with domain name requests received from a said user device are given a higher similarity ranking where the timestamps associated with the respective domain name requests are closer together, and lower similarity ranking where the timestamps associated with the respective domain name requests are further apart; and
periodically updating the set of similarity rankings based on further collected domain name requests.

19. The method of clause 18, wherein generating the set of similarity rankings is dependent on a timestamp proximity parameter, the timestamp proximity parameter may be associated with a predetermined cut off time within which timestamp proximity is measured.

20. The method of clause 18 or clause 19, wherein generating the set of similarity rankings is dependent on a decay factor, such that the similarity ranking between two domain names decays over time in accordance with the decay factor.

21. The method of any preceding clauses, wherein the model comprises a machine learning classifier trained to generate a set of one or more predicted domain names and associated similarity scores based on the first domain name.

22. A network management device comprising at least one processor, at least one communications device, and storage comprising computer-executable instructions which, when executed by the at least one processor, cause the network management device to:
provide a model for predicting one or more domain names associated with domain name requests to be generated by a user device, wherein the model is configured to generate a prediction of one or more domain name requests that are likely to be received from a user device following receipt of a first domain name request from the user device;
receive the first domain name request from the user device, the first domain name request including an indication of a first domain name;
process the first domain name using the model to determine a set of one or more predicted domain names;
send a request to a domain name categorization server over a communications network, the request including the first domain name and the set of one or more predicted domain names;
receive a response to the request, the response including categorization data for the first domain name and the set of one or more predicted domain names; and
perform domain name request filtering based on the categorization data.

23. A non-transitory computer readable storage medium comprising computer-executable instructions which, when executed by a processor, cause the processer to:
provide a model for predicting one or more domain names associated with domain name requests to be generated by a user device, wherein the model is configured to generate a prediction of one or more domain name requests that are likely to be received from a user device following receipt of a first domain name request from the user device;
receive the first domain name request from the user device, the first domain name request including an indication of a first domain name;
process the first domain name using the model to determine a set of one or more predicted domain names;
send a request to a domain name categorization server over a communications network, the request including the first domain name and the set of one or more predicted domain names;
receive a response to the request, the response including categorization data for the first domain name and the set of one or more predicted domain names; and
perform domain name request filtering based on the categorization data.

What is claimed is:

1. A method for enabling user devices to access resources hosted on one or more further devices over a communications network, access to said resources being filtered according to domain name categorization, the method comprising:
providing a model for predicting one or more domain names associated with domain name requests to be generated by a user device, wherein the model is configured to generate a prediction of one or more domain name requests that are likely to be received from a user device following receipt of a first domain name request from the user device;
receiving the first domain name request from the user device, the first domain name request including an indication of a first domain name;
processing the first domain name using the model to determine a set of one or more predicted domain names;
sending a request to a domain name categorization server over a communications network, the request including the first domain name and the set of one or more predicted domain names;
receiving a response to the request, the response including categorization data for the first domain name and the set of one or more predicted domain names; and
performing domain name request filtering based on the categorization data.

2. The method of claim 1, wherein domain name request filtering comprises:
providing at least part of the categorization data to the user device including categorization data associated with the first domain name; and
allowing the user device to access the resources associated with the first domain name in dependence on an outcome of a comparison of the categorization data with a set of one or more rules for filtering domain names for the user device.

3. The method of claim 2, wherein the set of one or more rules specify one or more categories of domain name that the user device is not entitled to access, and wherein if it is determined that the first domain name is associated to any one or more of the specified categories of domain name in the comparison, then the user device is not allowed to access the resource associated with the first domain name and if it is determined that the first domain name is not associated with one or more the specified categories then the user device is allowed to access the resource associated with the first domain name.

4. The method of claim 2, wherein allowing the user device to access the resources associated with the first domain name includes providing an Internet Protocol (IP) address associated with the first domain name to the user device.

5. The method of claim 2, wherein the method comprises:
sending a domain name request for at least the first domain name to a DNS server;
storing IP address data received from the DNS server in response to the domain name request; and
providing IP address data associated with the first domain name to the user device in dependence on whether it is determined that the user device is allowed to access the resource associated with the first domain name.

6. The method of claim 5, wherein sending the domain name request to the DNS server for at least the first domain name is triggered based on:
receipt of the first domain name request from the user device: or
receipt of the categorization data.

7. The method of claim 5, wherein sending the domain name request to the DNS server for at least the first domain name is dependent on a determination that the user device is allowed to access the resource associated with the first domain name.

8. The method of claim 5, wherein the method comprises:
sending domain name requests to the DNS server for at least some of the set of one or more predicted domain names;
storing IP address data received in response to the domain name requests sent to the DNS server for at least some of the set of one or more predicted domain names; and
providing IP address data associated with at least some of the set of one or more predicted domain names in dependence on whether it is determined that the user device is allowed to access the resources associate with at least some of the set of one or more predicted domain names.

9. The method of claim 8, wherein determining that the user device is allowed to access the resource associated with a said predicted domain name of the set of one or more predicted domain names involves comparing categorization data associated with the said predicted domain name with the set of one or more rules.

10. The method of claim 8, wherein sending domain name requests to the DNS server for at least some of the set of one or more predicted domain names is triggered based on:
   receiving the first domain name request from the user device; or
   receipt of the categorization data.

11. The method of claim 8, wherein sending a domain name request to the DNS server for a said predicted domain name is dependent on a determination that the user is allowed to access the resource associated with the said predicted domain name.

12. The method of claim 1, wherein domain name request filtering comprises:
   accessing a set of one or more rules for filtering domain names for the user device;
   comparing the categorization data for the first domain name with the set of one or more rules; and
   allowing the user device to access the resources associated with the first domain name in dependence on an outcome of the comparing the categorization data with the set of one or more rules.

13. The method of claim 1, wherein the categorization data associated with first domain name and the predicted domain names includes at least one of:
   an indication of a security characteristic associated with the respective domain name;
   an indication of security protocols associated with the respective domain name;
   an indication of a utility associated with the respective domain name;
   an indication of usage patterns associated with the respective domain name; and
   an indication of a maturity level associated with the respective domain name.

14. The method of claim 1, wherein the set of one or more rules are associated with the user device.

15. The method of claim 1, wherein the set of one or more rules are associated with a plurality of user devices.

16. The method of claim 1, wherein the method comprises determining a media access control (MAC) address associated with the user device and wherein the processing the first domain name using the model to determine the set of one of more predicted domain names includes processing the MAC address associated with the user device, wherein the set of one or more predicted domain names are dependent on the MAC address of the user device.

17. The method of claim 1, wherein the model is configured to receive the first domain name and process the domain name to generate a set of predicted domain names and scores associated with the predicted domain names, wherein the score associated with a said predicted domain name is representative of a likelihood that the user device will send a domain name request comprising the said predicted domain name following the first domain name request.

18. The method of claim 17, wherein the model is trained by:
   collecting domain name requests from one or more user devices, each domain name request being associated with a MAC address of the respective device and a timestamp of when the domain name request was generated;
   generating a set of similarity rankings between domain names based on timestamp proximity of associated domain name requests received from the same user device, wherein domain names associated with domain name requests received from a said user device are given a higher similarity ranking where the timestamps associated with the respective domain name requests are closer together, and lower similarity ranking where the timestamps associated with the respective domain name requests are further apart; and
   periodically updating the set of similarity rankings based on further collected domain name requests.

19. The method of claim 18, wherein generating the set of similarity rankings is dependent on a timestamp proximity parameter, the timestamp proximity parameter may be associated with a predetermined cut off time within which timestamp proximity is measured.

20. The method of claim 18, wherein generating the set of similarity rankings is dependent on a decay factor, such that the similarity ranking between two domain names decays over time in accordance with the decay factor.

21. The method of claim 1, wherein the model comprises a machine learning classifier trained to generate a set of one or more predicted domain names and associated similarity scores based on the first domain name.

22. A network management device comprising at least one processor, at least one communications device, and storage comprising computer-executable instructions which, when executed by the at least one processor, cause the network management device to:
   provide a model for predicting one or more domain names associated with domain name requests to be generated by a user device, wherein the model is configured to generate a prediction of one or more domain name requests that are likely to be received from a user device following receipt of a first domain name request from the user device;
   receive the first domain name request from the user device, the first domain name request including an indication of a first domain name;
   process the first domain name using the model to determine a set of one or more predicted domain names;
   send a request to a domain name categorization server over a communications network, the request including the first domain name and the set of one or more predicted domain names;
   receive a response to the request, the response including categorization data for the first domain name and the set of one or more predicted domain names; and
   perform domain name request filtering based on the categorization data.

23. A non-transitory computer readable storage medium comprising computer-executable instructions which, when executed by a processor, cause the processor to:
   provide a model for predicting one or more domain names associated with domain name requests to be generated by a user device, wherein the model is configured to generate a prediction of one or more domain name requests that are likely to be received from a user device following receipt of a first domain name request from the user device;

receive the first domain name request from the user device, the first domain name request including an indication of a first domain name;

process the first domain name using the model to determine a set of one or more predicted domain names;

send a request to a domain name categorization server over a communications network, the request including the first domain name and the set of one or more predicted domain names;

receive a response to the request, the response including categorization data for the first domain name and the set of one or more predicted domain names; and perform domain name request filtering based on the categorization data.

* * * * *